April 10, 1962 R. E. SCHELL 3,029,349
INSPECTION APPARATUS
Filed Nov. 3, 1958 3 Sheets-Sheet 2

INVENTOR.
ROGER E. SCHELL
BY
ATTORNEY

INVENTOR.
ROGER E. SCHELL
BY
ATTORNEY

United States Patent Office 3,029,349
Patented Apr. 10, 1962

3,029,349
INSPECTION APPARATUS
Roger E. Schell, Woodbury, N.J., assignor, by mesne assignments, to Crown Cork & Seal Company, Inc., Philadelphia, Pa., a corporation of New York
Filed Nov. 3, 1958, Ser. No. 771,422
12 Claims. (Cl. 250—223)

This invention relates generally to inspection apparatus, and more specifically to an improved optical system for use in combination with the inspection apparatus. The improved inspection apparatus of the present invention is particularly useful for inspecting fluids in transparent containers for the purpose of ascertaining the possible presence of any foreign particles therein.

It has been proposed to inspect the fluid contents of a transparent container by causing the fluid to rotate and thereby causing any foreign particles therein to rotate with the fluid. By passing a beam of light through the transparent container and by having the light emerging from the container impinge upon a photosensitive device, a signal is obtained from the photosensitive device when a particle of foreign matter modulates the light beam. Apparatus for inspecting fluids in transparent containers in this manner has been disclosed in the United States Patent No. 2,132,447, issued October 11, 1938, to G. P. Stout. According to the teachings of this patent, however, the container has been inspected while it was in a stationary position.

In order to speed up the inspection process, it has been proposed to inspect the transparent container while it is in motion. In one type of inspection apparatus, an oscillatory optical system has been used. Such a system presents synchronization and vibratory problems that may impair to a degree the sensitive inspection means necessary to detect the small foreign particles. In another type of inspection apparatus, it had been proposed to have the transparent container moved past a fixed beam of light. In the latter system, the light scans the contents of the moving container. In such a system, however, it had been desirable to have sensitive frequency discriminating means, whereby signals obtained from the moving container were distinguished from the signals produced by the modulation of the beam by the rotating particle within the container. An example of such a system is described in the United States Patent No. 2,253,581 for a Continuous Inspection Device, issued to James H. Reynolds on August 26, 1941.

Accordingly, it is an object of the present invention to provide improved inspection apparatus for inspecting the liquid contents of transparent containers for foreign particles therein.

Another object of the present invention is to provide improved inspection means for inspecting the fluid contents of a transparent container without the necessity of stopping or slowing down the travel of the container.

Still another object of the present invention is to provide improved inspection means utilizing stationary optical means for moving a beam of light synchronously with a moving container in a manner whereby the light emerging from the moving container over a predetermined path of inspection may be analyzed.

A further object of the present invention is to provide an improved optical system adapted for use in combination with inspection apparatus of the type described.

In accordance with the present invention, the foregoing and related advantages are attained by means of apparatus including a stationary optical system in a novel combination adapted to inspect the fluid contents of a transparent container during its travel along a predetermined path of inspection. The fluid contents of the container are caused to rotate so that any foreign particles within the fluid will rotate with the fluid. A plurality of containers are caused to travel on the periphery of a rotating turret. A lamp within the turret radiates light in all directions. A wall between the containers and the lamp is formed with a separate narrow slit behind each container so that light from the lamp will pass through each container in a beam narrower than the transverse diameter of the container. Thus, a beam of radiant energy from the lamp will always be allowed to pass through the container and will move with the container so that there will be no relative motion between the beam and the container. Light emerging from the container is directed upon stationary optical means while the container is moving along the predetermined path of inspection. A photosensitive device is positioned at substantially the focal point of the optical means for the purpose of providing a signal when a foreign particle within the fluid of a container modulates the beam of light.

In another embodiment of the present invention, means are provided to direct a plurality of beams of light through each container whose fluid contents are undergoing inspection. By spacing the beams through each container in a manner whereby they pass on both sides of the longitudinal axis of the container, the time for detecting a foreign particle within the rotating fluid contents of the container is shortened.

The novel features of the present invention, as well as the invention itself, both as to its organization and methods of operation, will be understood in detail when considered in connection with the accompanying drawings in which similar reference characters represent similar parts, and in which.

Figure 1:
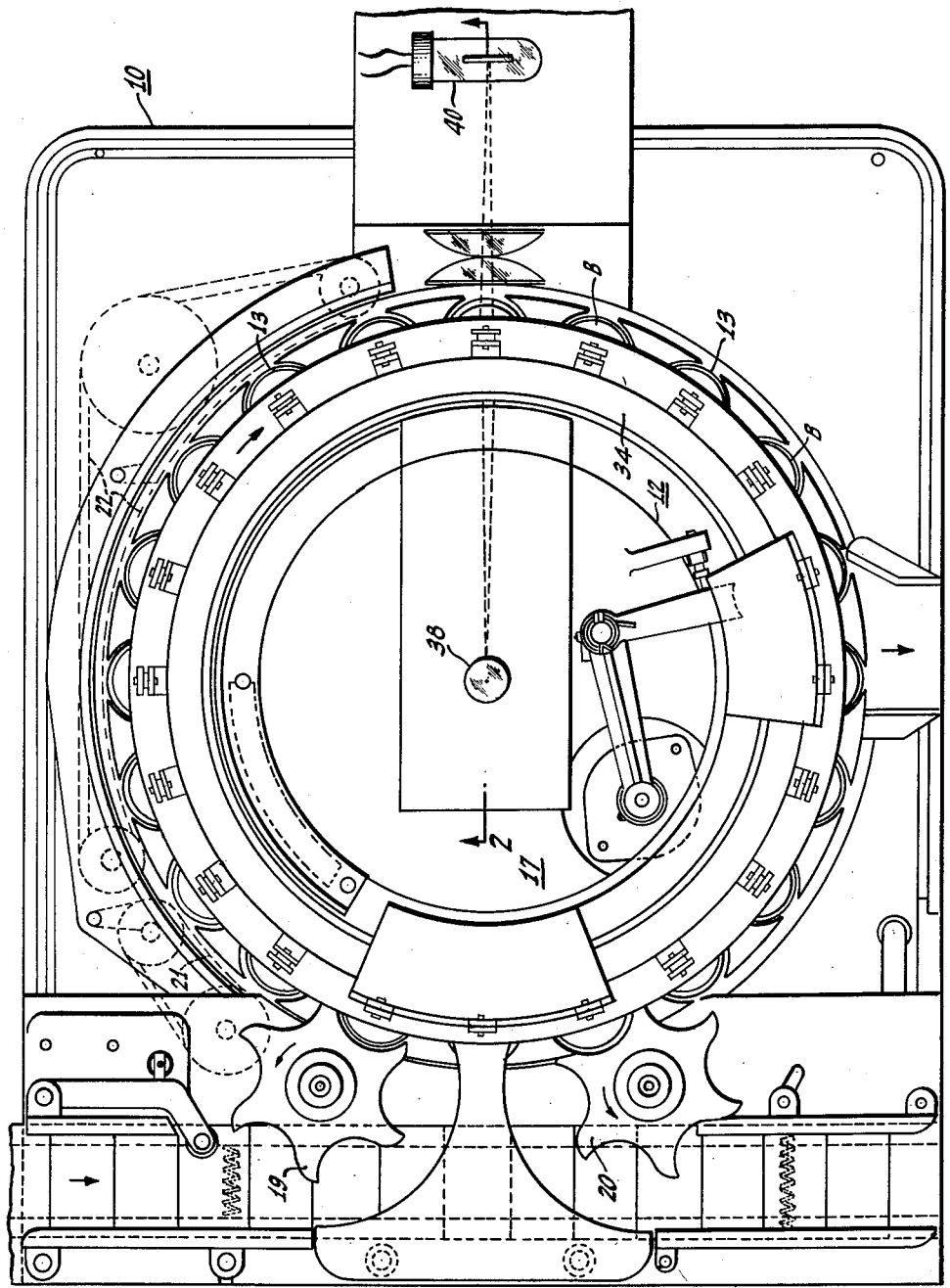
FIG. 1 is a plan view of inspection apparatus employing therewith, in combination, the novel optical system of the present invention.
Figure 2:
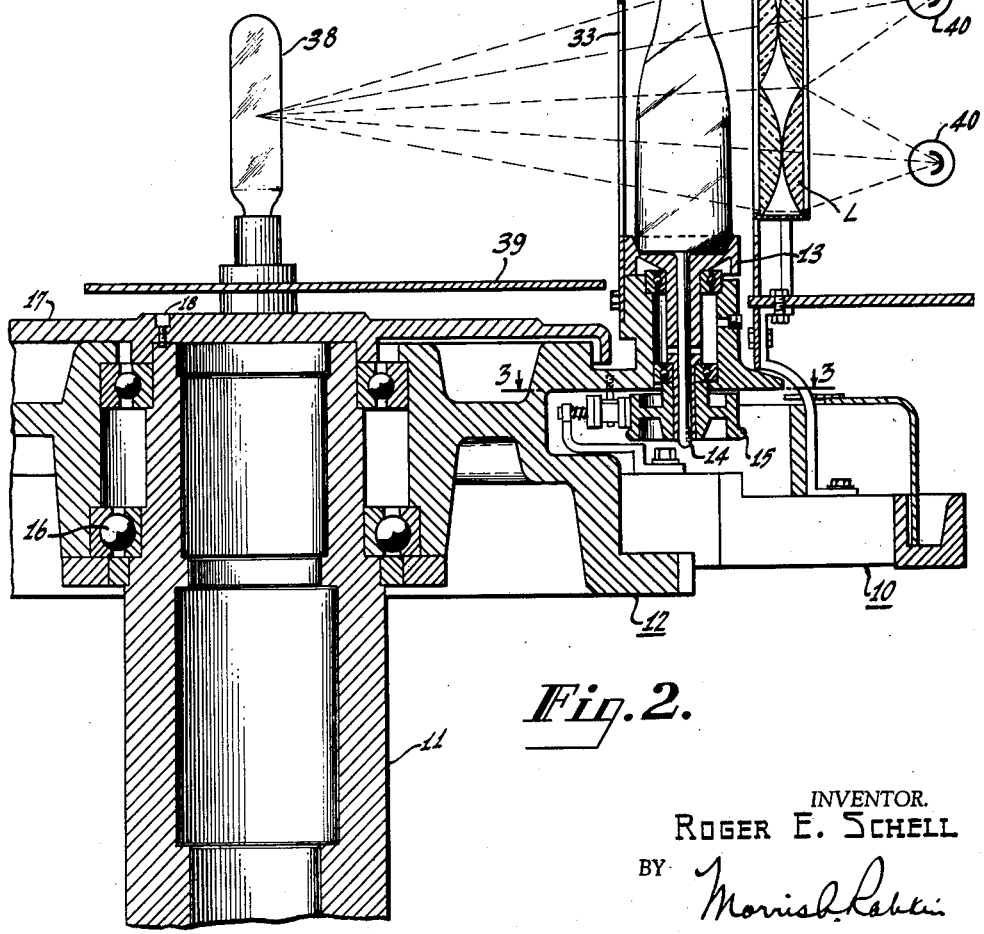
FIG. 2 is an enlarged side view, partially in cross-section taken along the line 2—2 in FIG. 1, and viewed in the direction of the arrows, showing a container being inspected by the novel optical system of the present invention.

Referring now to the drawings, FIGS. 1 and 2, the inspection apparatus comprises a supporting structure 10 from which emerges a hollow central standard 11. Mounted for revolution upon the standard 11 is a turret 12 which may be caused to rotate clockwise in any conventional manner. Mounted for revolution in the turret 12 and adjacent its periphery is a plurality of bottle cups 13. Each is provided with a drum 15 for the purpose of revolving the cup and also for abruptly stopping it at a designated time as is explained hereinafter. The turret 12 may be mounted upon ball bearings 16 in conjunction with the standard 11. The standard 11 has a turret cover plate 17 secured by cap screws 18 at its upper edge.

To feed containers, such as bottles B, into the cups 13, there is shown a star wheel 19 adapted to operate in a manner conventional with bottle handling machinery; and to remove bottles from the cups, there is provided a star wheel 20, the infeed and outfeed devices being synchronized to work in unison with the revolution of the turret 12.

For the purpose of revolving the bottles and the contents thereof, there are shown friction bands 21 and 22 (FIG. 1) that may be driven in any suitable manner, as by a motor for example. It is possible to drive the bands in opposite directions so that a cup upon leaving the influence of one band is immediately jerked in the opposite direction by the other. An improved agitating and mixing action is secured by such procedure. The bands may move in the same direction at approximately equal speeds; or one band may move faster than the other but in the same direction; or in the interest of simplification, one band may be eliminated entirely. In any event, it is apparent that the bands acting upon drums 15 turn the individual cups 13 in such a manner that they are rotating rapidly when they come within the range of the optical system, at which time the cups and bottles are abruptly stopped by means of individual brakes to which special attention is now directed.

Figure 3:
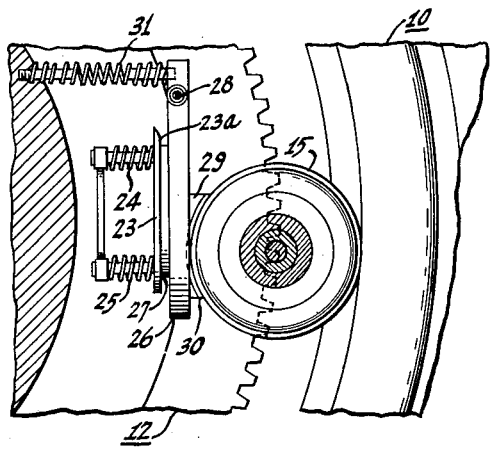
FIG. 3 is an enlarged plan view of the brake structure taken along the line 3—3 of FIG. 2, looking in the direction of the arrows.

These brakes (FIG. 3) comprise a stationary cam-like member 23 fixedly mounted to the supporting structure 10 through pins 24 and held outwardly by means of strong springs 25. It will be noted that the outer face of the member 23, and particularly that portion thereof at the end from which bottles approach, is sloped as at 23a in such manner as to deflect an object contacting said surface and member. Brake arms 26, having surfaces 27 similar to 23a, are pivotally mounted as at 28, and carry brake shoes 29 and brake linings 30. A spring 31 serves to hold the brake arms 26 normally out of engagement with the drums 15 and hence the brake open, except during such time as surfaces 26 and 27 thereof are in contact with the element 23.

Mounted upon the revolving turret 12 is a circular wall 32 having windows or apertures 33 opposite each of the cups 13. The wall 32 carries an upper ring 34 in which spindles 35 are revolvably mounted. Each spindle 35 carries a cup 36 for engagement with the caps of bottles B, thereby keeping the bottles centered during revolution and while they are in the machine.

An important feature in the inspection process of the present invention lies in maintaining the optical means stationary, allowing the forward motion of the bottle to continue, and causing the beam of light through the container to move at the same rate as the container is moving. In this manner, there is no relative motion between the beam of light and the container. The light emerging from the container along the limited predetermined path of inspection is collected and analyzed for abrupt changes in intensity.

Means are provided to pass a uniform beam of light, narrower than the transverse diameter of the container B, through the container B. To this end, a source of radiant energy, such as a lamp 38, is disposed at substantially the center of the turret 12. The lamp 38 is disposed on a plate 39 fixed to the top of the standard 11. It will now be understood that, as the turret rotates, a beam of radiant energy will always pass through each aperture slit 33 in the wall 32 of the turret 12 and move uniformly with the containers B while the turret is being rotated. A stationary optical system, illustrated herein by one or more pairs of plano-convex lenses L, is fixed to the supporting structure 10 by any suitable means. The lenses L are disposed in a manner to collect the light emanating from the container B while the container B moves over a limited, predetermined path of inspection. A photosensitive device, such as a photocell 40, is disposed at substantially the focal point of each set of lenses L, by any suitable means.

Figure 4:
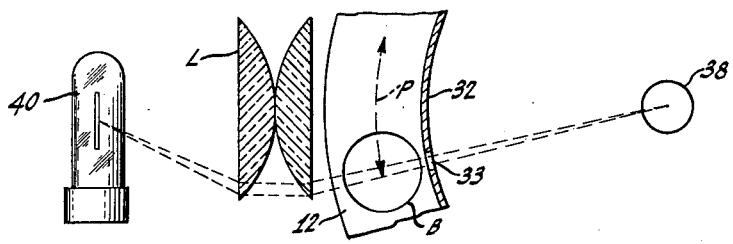
FIGS. 4, 5, 6 are plan views, largely diagrammatic, illustrating a container undergoing inspection along a predetermined path of inspection.
Figure 5:
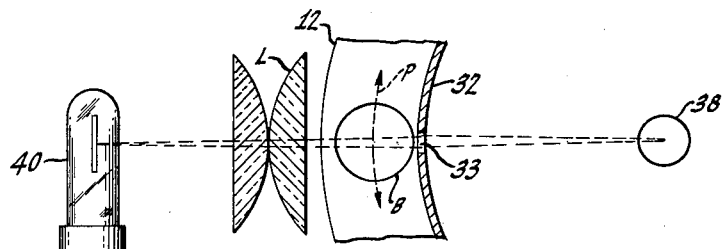
Figure 6:
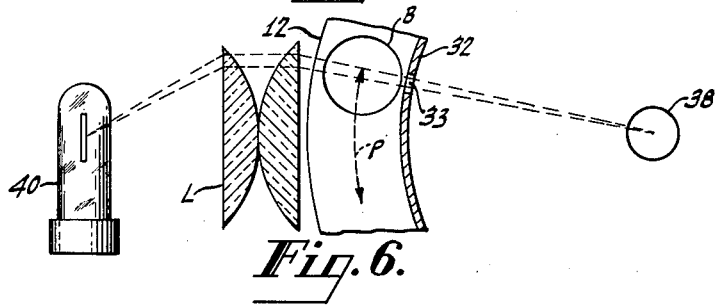

FIGS. 4, 5, and 6 illustrate the passage of a container, or bottle B, through the predetermined path P of inspection, shown by the double headed arrow. In FIG. 4, the container B is just entering the path of inspection P. The beam of light from the lamp 38 is caused to move at the same rate of speed as the container B is moving because the slit 33 in the wall 32 of the turret 12 moves in unison with the container B. The light emanating from the container B is received by the stationary lenses L and directed to their focal point for detection by the photocell 40. FIG. 5 shows the container half-way along the path of inspection P. The beam of light has moved along at the same rate of speed as the container. In FIG. 6, the container B is shown at the point where it is just about to leave the path of inspection P.

The operation of the inspection apparatus, in accordance with present invention, will now be described. Transparent containers B are taken from the conveyor line by the star-wheel 19. The containers B are rotated rapidly, as by bands 21 and 22. As each container B approaches the brake member 23, it is abruptly stopped by virtue of the brake arms 26, having been forced inwardly upon the surface 27 coming in contact with the surface 23a. This action forces the brake shoe 29 and its lining 30 against the drum 15 in such a manner as to abruptly check the rotary movement of the container B. A uniform beam of light from the lamp 38 is always moving with, and at the same speed as, each container B. The liquid contents of the container B will still be swirling rapidly when the container B reaches the predetermined path of inspection P. Any foreign particles in the swirling fluid will pass one or more times through the beam of light through the container B. If a foreign particle interrupts the beam of light while the container is moving along the predetermined path of inspection P, the light beam will be modulated, and the photosensitive device 40 will provide a signal, as in the manner described in the aforementioned United States Patent No. 2,132,447. A container B having any unwanted foreign particle therein may be rejected from the conveyor line by any suitable means, as described in the aforementioned prior art.

By having a uniform beam of light, narrower than the transverse diameter of the container, move at the same rate as the container, and by maintaining the beam of light substantially constant with respect to the container, it is possible to inspect the container for foreign particles over a relatively longer period of time than would be possible if the beam of light were stationary. Also, by having the beam of light move with the container, it is not necessary to distinguish between the modulation of the beam of light by a foreign particle within the fluid of the container and the motion of the container with respect to the beam of light, thereby eliminating the need of sensitive frequency detecting means.

Figure 7:
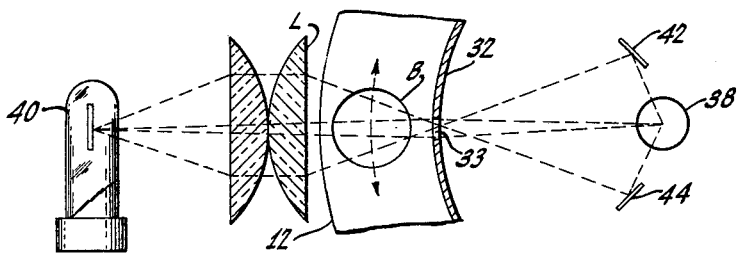
FIG. 7 is also a diagrammatic view showing an arrangement by means of which a plurality of light beams may be made to move along with a moving container whose fluid contents are undergoing inspection.

Referring now to FIG. 7, there is shown a modification of the inspection apparatus for either increasing the speed of inspection, or for inspecting containers whose sides are partially covered with labels, or which contain defects in the glass, which prevent the passage of light through certain portions of the container. This modification differs from the apparatus heretofore described in that a plurality of light beams are caused to pass through the container undergoing inspection. A plurality of beams may be obtained by providing a plurality of aperture slits 33 in the wall 32 behind each container B. Another means of providing a plurality of beams is to use mirrors 42 and 44, as shown in FIG. 7. The mirrors 42 and 44 are fixed within the turret 12 in a manner whereby they will reflect light from the lamp 38 through the aperture slit 33 in the wall 32. Thus, three beams of light may be directed through the container B in a manner whereby these beams of light move at substantially the same speed as the container B in its travel along the path of inspection P.

While the mirrors 42 and 44 are slightly displaced from the lamp 38, there will be substantially no relative motion between the beams of light from the mirrors 42, 44 and the lamp 38 as the container advances across the path of inspection. Also, since the mirrors 42 and 44 are substantially symmetrically disposed with respect to the lamp 38, any slight increase in the intensity of light from one mirror is substantially offset by a relative increase in intensity of the beam from the other mirror so that the total intensity of light passing through the transparent container B will be substantially the same at the focus of the optical system L, that is, at the photocell 40.

Thus, there has been shown and described in accordance with the objects of the present invention, apparatus for inspecting the fluid contents of a transparent container for foreign particles therein. In this apparatus at least one beam is caused to penetrate the transparent container and to move along at the same speed as the container through a path of inspection. A stationary optical system focuses the light emerging from the transparent container along its path of inspection to a point at which a photosensitive device is positioned. Any abrupt modulation of the light beam will provide a signal that may be used to reject the container by any suitable means in the aforementioned prior art.

What is claimed is:

1. Apparatus comprising a source of radiant energy, means defining a path of inspection in said apparatus, means to move an article to be inspected along said path of inspection, light-directing means fixed to said last-mentioned means to move a uniform beam of said radiant energy over said path of inspection, fixed optical means disposed to receive radiant energy from said beam during its movement over said path of inspection, and fixed detecting means disposed to receive radiant energy after it has passed through said optical means for detecting changes in the intensity of said radiant energy.

2. Apparatus comprising a fixed source of radiant energy, means defining a path of inspection in said apparatus, means to move an article to be inspected along said path of inspection, light-directing means fixed to said last-mentioned means to move a uniform beam of said radiant energy over said path of inspection, plurality of sets of fixed optical means disposed to receive radiant energy from said beam during its movement over said path of inspection, each of said sets of optical means having a separate focal point, and fixed detecting means disposed at substantially said focal points of said sets of optical means to receive radiant energy after it has passed through said optical means for detecting changes in the intensity of said radiant energy.

3. Apparatus comprising a fixed source of light, means to move a transparent object along a path of inspection, a wall fixed to said moving means and disposed between said source and said object, said wall being formed with a slit therein to direct a uniform beam of light from said source to said object whereby said uniform beam of light will move with the movement of said object along said path of inspection, fixed lens means disposed to receive light from said beam after it has passed through said object during its movement along said path of inspection, and fixed detecting means disposed to provide a signal in response to changes in the intensity of light through said lens means.

4. Apparatus comprising a fixed source of light, means to move a transparent object along a path of inspection, a wall fixed to said moving means and disposed between said source and said object, said wall being formed with a slit therein, means to direct a plurality of uniform beams of light from said source through said slit to said object whereby said uniform beams move with said object along said path of inspection, fixed lens means disposed to receive light from said beams after it has passed through said object during its movement along said path of inspection, and fixed detecting means disposed to provide a signal in response to changes in the intensity of light through said lens means.

5. In apparatus for inspecting fluid in a transparent container for a foreign particle while said fluid and said foreign particle are rotating within said container and while said container is moving along a path of inspection, the combination of a fixed source of radiant energy, means for moving said container along said path of inspection, light-directing means fixed to said container moving means, means for passing a uniform beam of radiant energy from said fixed source through said container while said container is moving, said light-directing means including means to keep said beam stationary with respect to said moving container, stationary optical means positioned to receive radiant energy from said beam emerging from said container while said container passes along said path of inspection, and stationary photosensitive means disposed to receive radiant energy from said optical means for producing a signal when said particle moves through said beam.

6. In apparatus of the type used for inspecting fluids in a transparent container for a foreign particle while said fluid and said foreign particle are rotating within said container and while said container is moving along a predetermined path of inspection; a fixed source of light, means for moving said container along said path of inspection, light-directing means including a slitted wall fixed to said container moving means for passing a plurality of beams of light from said fixed source narrower than said container through said container and for maintaining said beams of light substantially stationary with respect to said moving container, stationary lens means positioned to receive light emerging from said container while said container passes along said predetermined path of inspection, and stationary photosensitive means disposed at substantially the focal point of said lens means for providing a signal when said particle moves through at least one of said beams of light.

7. In apparatus of the type wherein the fluid contents of a transparent container are caused to rotate and wherein said container is moved through a path of inspection while said fluid contents are rotating, a fixed source of light, means for moving said container along said path of inspection, light-directing means fixed to said container means moving to pass a beam of light from said fixed source narrower than said container through said container, said light-directing means including a wall formed with a slit therein so as to maintain said beam of light stationary with respect to said container during its movement along said path of inspection, fixed optical means positioned to receive said beam of light emerging from said container in its movement along said path, and fixed photosensitive means disposed to detect changes in the intensity of light through said optical means.

8. In combination, a fixed source of light, means to move a transparent object along a predetermined path, a wall fixed to said object moving means and disposed between said source and said object, said wall being formed with a relatively narrow slit whereby a uniform beam of light from said source may pass therethrough and through said object, said wall being adapted to move at the same speed as said object whereby said beam remains substantially stationary with respect to said object, stationary optical means disposed to receive light from said beam passing through said object in its travel along said predetermined path, and stationary photosensitive means fixed at substantially the focal point of said optical means.

9. Inspection apparatus comprising a revolvable turret, means to support a plurality of containers adjacent the periphery of said turret, a fixed source of light disposed within said turret, said turret comprising means to produce a uniform beam of light from said fixed source including a wall formed with a slit between each of said containers and said source whereby to direct a uniform beam of light to each of said containers as said containers rotate with said turret, stationary optical means disposed to receive light passing through each of said containers as each passes along a predetermined path of inspection, and stationary photosensitive means disposed to receive light from said optical means whereby to determine any modulation of said light beam.

10. Apparatus for inspecting fluid in a transparent container comprising means to cause said fluid to rotate within said container, means to move said container along a predetermined path of inspection while said fluid is rotating therein, means to direct a uniform beam of radiant energy through said container, said last mentioned means including a fixed source of radiant energy and aperture means to maintain said beam stationary and uniform with respect to said container during said container's movement along said path of inspection, said aperture means being fixed to said means to move said container, a stationary optical system disposed to receive radiant energy emerging from said container along said path of inspection, and stationary photosensitive means disposed at substantially the focal point of said optical means whereby to detect changes in the intensity of said beam when modulated by a foreign particle rotating in said fluid.

11. The process of inspecting the fluid contents of a transparent container for the possible presence of a foreign particle therein comprising the steps of moving said container along a predetermined path of inspection, directing from a fixed source of light a uniform beam of light narrower than said container through said container, moving said uniform beam at the same speed as said container whereby said beam is maintained stationary with respect to said moving container, focusing said beam at substantially one spot after passing through said container during its movement along said path of inspection, and detecting changes in the intensity of said beam at substantially its focus.

12. The method of inspecting fluid in transparent packages to detect the presence of foreign particles therein; said method comprising the steps of rotating the contents of said packages, moving said packages successively forward along a path of inspection, passing from a fixed source of radiant energy a separate uniform beam of radiant energy through each of said packages while said fluid therein is rotating, moving each of said uniform beams at the same speed as said packages whereby each of said beams through said packages is maintained uniform and stationary with respect to said packages during their movement along said path of inspection, concentrating radiant energy transmitted through each of said packages at substantially one spot while moving along said path of inspection, and detecting at said spot impulses set up by abrupt changes in the intensity of said transmitted energy caused by the movement of a foreign particle into and out of said beam.

References Cited in the file of this patent

UNITED STATES PATENTS

| | | |
|---|---|---|
| 2,132,447 | Stout | Oct. 11, 1938 |
| 2,253,581 | Reynolds | Aug. 26, 1941 |
| 2,426,355 | Kellogg | Aug. 26, 1947 |